US005640326A

United States Patent [19]

Goldie et al.

[11] Patent Number: 5,640,326

[45] Date of Patent: Jun. 17, 1997

[54] PRINTED COPY WASTE REDUCTION SYSTEM FOR SINGLE GRIPPER CONVEYORS

[76] Inventors: Fred Goldie, 208 Boundary St., Toms River, N.J. 08753; Brett M. Garbus, 144 McCosh Rd., Clifton, N.J. 07043

[21] Appl. No.: 492,233

[22] Filed: Jun. 19, 1995

[51] Int. Cl.$^{6}$ .............................. G06F 17/00; G06G 7/48

[52] U.S. Cl. ............................... 364/478.18; 364/478.11; 364/478.01; 198/349; 198/349.8

[58] Field of Search ......................... 364/478.01, 478.02, 364/478.04, 478.11, 478.16, 478.18; 270/52.04, 52.06; 271/256, 257; 101/2; 198/339.1, 348, 349, 349.8, 349.95

[56] References Cited

U.S. PATENT DOCUMENTS

| | | | |
|---|---|---|---|
| 4,545,031 | 10/1985 | Kobayashi | 271/227 |
| 4,566,681 | 1/1986 | Bottcher et al. | 270/52.04 |
| 4,757,984 | 7/1988 | Rowe et al. | 270/58.03 |
| 4,799,661 | 1/1989 | Nail | 270/52.04 |
| 5,011,123 | 4/1991 | Vigano | 270/52.04 |
| 5,522,587 | 6/1996 | Banks et al. | 270/58.03 |

*Primary Examiner*—Paul P. Gordon
*Assistant Examiner*—Robert J. Dolan

[57] ABSTRACT

In a waste management system for saving check copies of printed copy entering a single gripper conveyor, check copies are saved by providing the system operator with the option of pressing a check copy switch to instruct the system to count as being of undecided quality, while copy quality is checked, all printed copy entering the conveyor from the time the check copy switch is pressed. Once the copy quality is determined, the operator can instruct the system to save or discard the check copies.

1 Claim, 2 Drawing Sheets

PRINTED COPY WASTE REDUCTION SYSTEM FOR SINGLE GRIPPER CONVEYORS

BACKGROUND

1. Field of Invention

The present invention relates to single gripper conveyor systems, specifically an improved system of waste management resulting in savings in cost and natural resources.

2. Description of Prior Art

One method of carrying printed product from a printing press to a distribution area is via a single gripper conveyor system. Printed copy exits the press and enters the conveyor one copy at a time and is carried past a waste release to a distribution area.

U.S. Pat. Nos. 3,955,667 (1976), 3,671,035 (1977), and 4,201,286 (1980), all to FERAG AG., discuss the Single Gripper Conveyor as well as U.S. Pat. Nos. 4,746,007 (1988), 4,852,722 (1988), and 4,905,818 (1990), all to QUIPP INCORPORATED.

Currently, all printed copy that enters the conveyor must be selected as either waste copy or good copy. If the printed copy is selected as waste, the grippers carrying the waste product are electrically labelled to direct them to be discarded at a waste release near the end of the conveyor before the copy reaches the distribution center. If the operator selects the copy to be good, the next copy that enters the conveyor is considered good and is electrically marked as such. This copy will bypass the waste release and continue to the distribution area. However, all copy in front of the first copy marked good will be discarded at the waste release. This product may be good copy, but cannot be accessed because of current operating limitations. An existing limitation is that since the printed copy may contain multiple pages, every page must be inspected for quality before the operator can judge it as good copy. As the operator is inspecting the entire copy, additional copy is entering the conveyor at a typical startup rate of 16,000 to 20,000 copies per hour or the equivalent of 5.5 copies every second. It takes between 10 to 20 seconds to check a small product's quality. This generates a loss of approximately 100 wasted copies every time a printing press starts. If the size of the copy is larger, the time to inspect the copy increases as well, generating more wasted copy. Another disadvantage is the availability of only two conveyor selections good and waste.

SUMMARY OF THE INVENTION

Accordingly, the present invention overcomes the disadvantages of the prior art by creating a third selection for the system operator called check copy. When the quality of printed copy entering the conveyor is questionable, the operator depresses a switch labeled check copy that electrically marks the copy as undecided. If the operator inspects the copy and selects it as good, the invention saves all of the copy printed from the time the check copy switch was depressed until the good copy selection had been made, thus saving good copy which would have been discarded by prior art systems.

Further objects and advantages of our invention will become apparent from a consideration of the drawings and ensuing description.

BRIEF DESCRIPTION OF THE DRAWINGS

The present drawings will be more fully understood by reference to the following detailed description thereof when read in conjunction with the attached drawings, and wherein.

DETAILED DESCRIPTION

Figure 1:
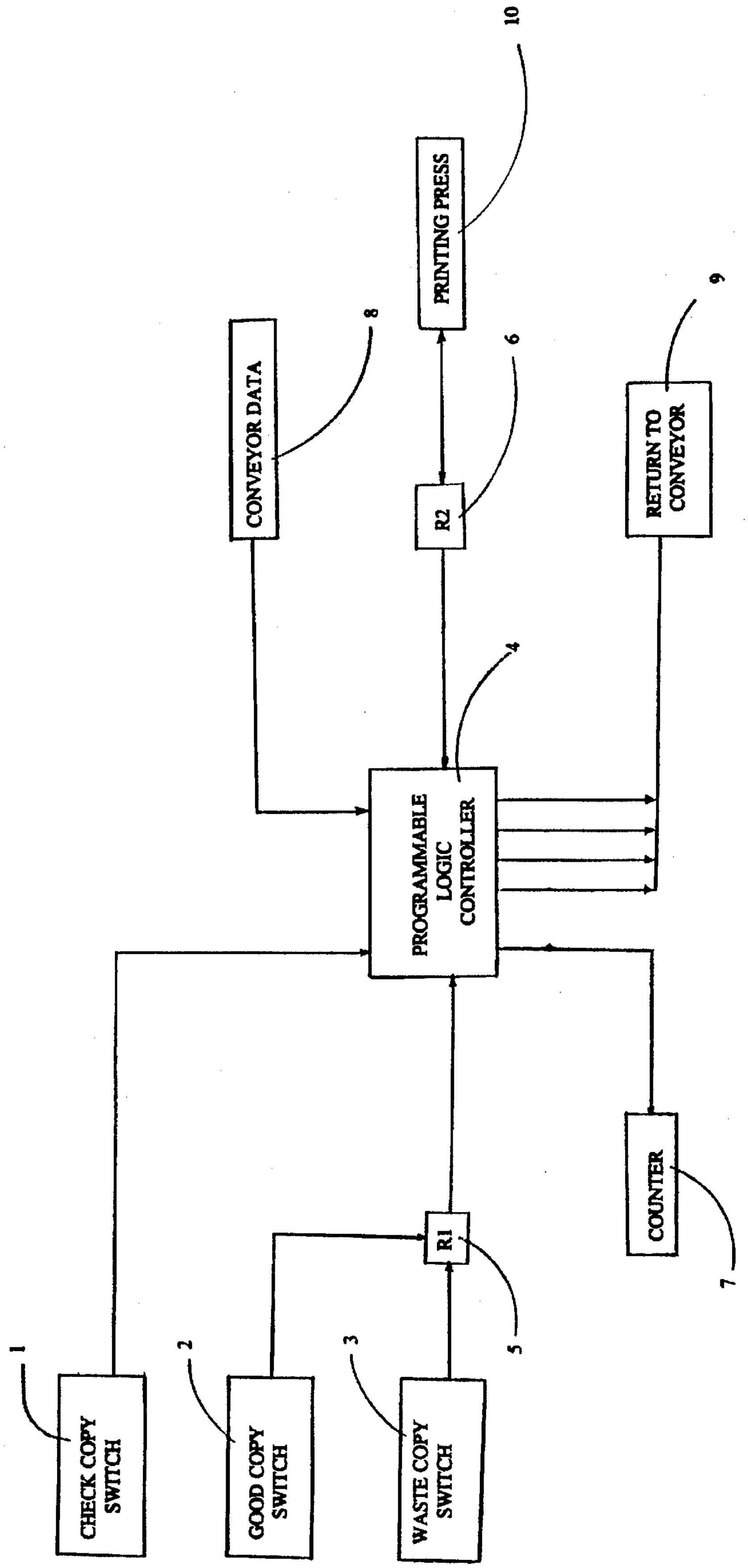
FIG. 1 is a diagram of the system illustrating its general geometry

The invention illustrated in FIG. 1 includes an electrical enclosure containing three lighted switches; the switches are check copy switch 1, good copy switch 2, and waste copy switch 3.

Check copy switch 1 is an operator interface to instruct a programmable logic controller 4 by means of a normally open contact to monitor the number of passing grippers on a single gripper conveyor utilizing conveyor data 8. If check copy switch 1 is depressed, the switch is made to flash off and on by programmable logic controller 4 signalling that the invention is active. When check copy switch 1 is depressed a second time after the programmable logic controller 4 is marking grippers on single gripper conveyor, programmable logic controller 4 is made to clear internal registers and begin counting passing gripper locations utilizing conveyor data 8. The lighted check copy switch 1 is made to stay illuminated for two seconds in order to confirm to the host system operator that he has marked a new group of printed copy. If check copy switch 1 has been depressed by the operator, and after two minutes, the operator has not made a choice to select printed copy as either waste copy or good copy, programmable logic controller 4 will stop marking grippers and deactivate.

Good copy switch 2 is an operator interface that signals to programmable logic controller 4 as well as to the single gripper conveyor that the printed copy has been selected as good. Good copy switch 2 contains a normally open contact used in contact with programmable logic controller 4. Good copy switch 2 also contains a normally open contact used to enable the good copy relay R1 5. Good copy switch 2 is illuminated when the operator selects printed copy as good.

Waste copy switch 3 contains one normally open contact to instruct programmable logic controller 4 that all copies being printed are selected as waste. Programmable logic controller 4 will only permit check copy switch 1 to operate while all printed copy entering said single gripper conveyor has been marked as waste by the conveyor system. Waste copy switch 3 also contains a normally closed contact used to enable relay R1 5 when incoming copy is selected as good and de-energize relay R1 5 when incoming printed copy is selected as waste. Waste copy switch 3 is illuminated through relay R1 5 when waste copy is selected.

Programmable logic controller 4 receives a signal generated from printing press 10 that interlocks printing press 10 and programmable logic controller 4 through relay R2 6. Relay R2 6 monitors printing press 10. Relay R2 6 is enabled when printing press 10 is not stopped and has reached an acceptable printing speed. If printing press 10 is stopped the selection of good copy cannot be achieved.

Programmable logic controller 4 receives a timing signal from conveyor data 8 and utilizes said signal to mark a reference point each time said gripper passes a reference point on said conveyor system.

While marking said copy as undecided, programmable logic controller 4 counts the location of grippers in internal shift registers. As each internal shift register is filled with data, the next internal shift register in sequence is selected and filled with data until the operator depresses either good copy switch 2 or waste copy switch 3. If good copy switch 2 is depressed, programmable logic controller 4 sets the actual number of undecided copy to be saved, but will continue to fill the current internal shift register until it is filled. Programmable logic controller 4 then saves all said undecided copy by enabling all programmable logic controller 4 outputs simultaneously. After counting the length of said internal shift registers, the enable is removed from programmable logic controller 4 outputs. Conveyor data 8 is manipulated in programmable logic controller 4 by the length of said internal shift register multiplied by the amount of registers utilized and returned to conveyor system 9 for application. If waste copy switch 3 is selected, the conveyor will continue to discard copy at the waste release.

Programmable logic controller 4 has a separate output which increments an external counter 7 each time a copy is saved.

Figure 2:
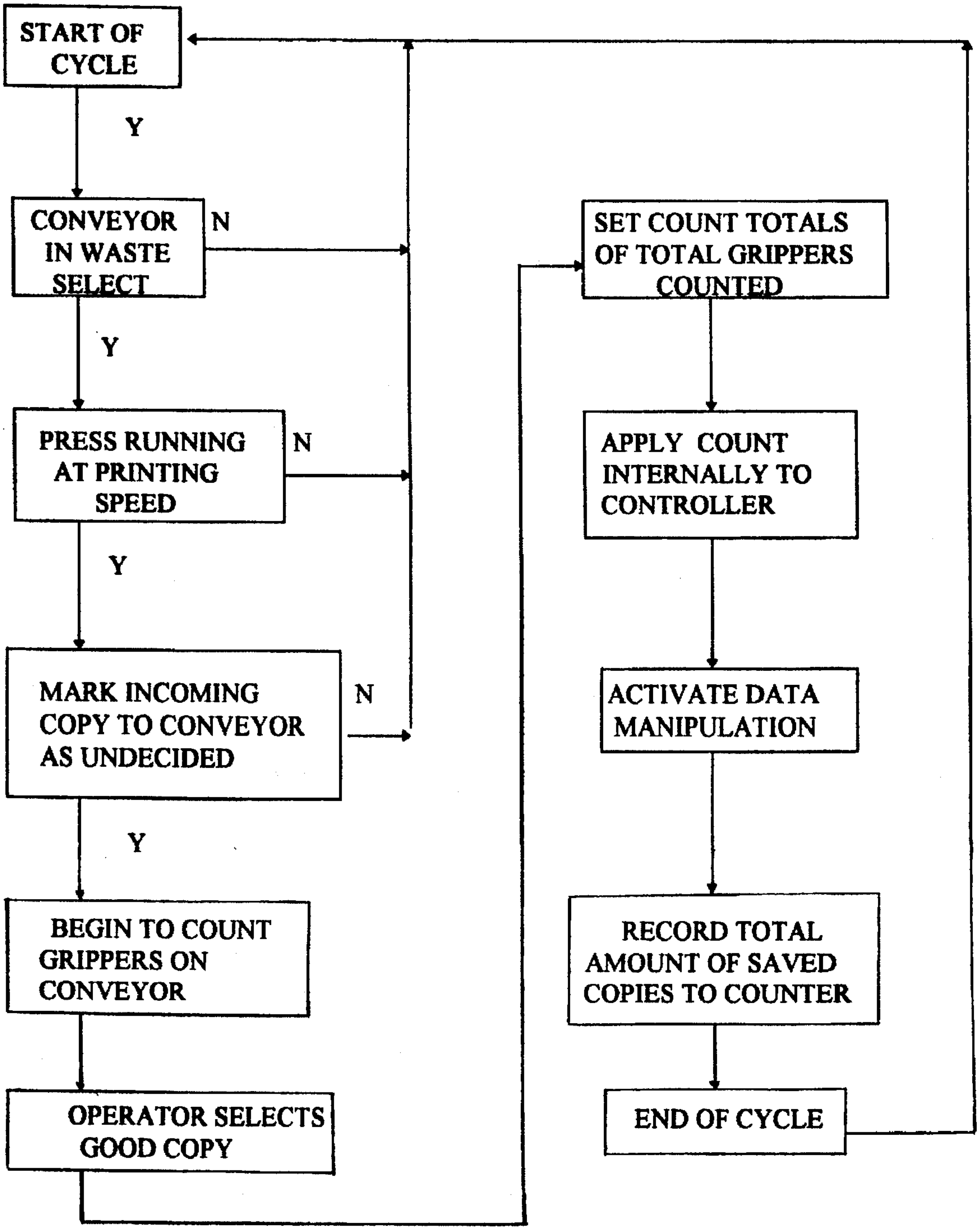
FIG. 2 is a simple systems operation flowchart

Referring now to FIG. 2, at start of a cycle, check copy switch 1, good copy switch 2 and waste copy switch 3 are inactive. Waste copy switch 3 is illuminated because the conveyor has selected all copy entering the conveyor as waste. When printing press 10 achieves printing speed, relay R2 6 is enabled allowing check copy switch 1 to become active. As papers exit the printing press and enter the single gripper conveyor and at the operators discretion, check copy switch 1 is depressed. Check copy switch 1 begins to count grippers on single gripper conveyor from conveyor data 8 information. Check copy switch 1 flashes continuously as grippers are being counted. If system operator depresses check copy switch 1 a second time while counting grippers, said switch will stay steadily illuminated for 2 seconds then start flashing again. This informs the operator that a new group of printed copy is being marked. If the operator selects the printed copy as waste, the operator depresses waste copy switch 3 and the system reverts back to start of cycle. Check copy switch 1 will turn off and waste copy switch 3 will illuminate. However, if the operator selects the printed copy as good copy, check copy switch 1 will turn off and good copy switch 3 will illuminate. Programmable logic controller 4 utilizes the data from conveyor data 8, manipulates it and returns it to the conveyor data where it applies the data.

Programmable logic controller 4 outputs total count of numbers saved to an external counter 7. System becomes dormant at end of cycle.

SUMMARY

Accordingly, the reader will see that the addition of a check copy operator selection on the single gripper conveyor system can be used to enhance waste management. It allows the system operator the ability to correctly mark all the incoming printed copy. In addition, it allows the operator the option to take more time to examine the printed copy resulting in a higher quality product. Furthermore, by enhancing waste management it also saves on printing costs and the waste of natural resources.

We claim:

1. A waste management system for saving check copies of printed copy entering a single gripper conveyor, wherein the grippers contain good or waste copy, said system comprising:

conveyor monitoring means comprising a sensor arranged so as to emit a sensing signal each time a gripper on said conveyor passes a predetermined reference point;

processing means for counting sensing signals from said conveyor monitoring means when the quality of said printed copy is undecided and is being checked, and for controlling said conveyor so as to either save as good or discard as waste said printed copy in response to an operator interface;

operator interface means for communicating with said processing means to allow an operator to control said processing means to save as good, discard as waste, or count as undecided, said printed copy at the operator's discretion;

a counting means for indicating the total number of said undecided copies saved.

* * * * *